US010348718B2

(12) United States Patent
Thakkar

(10) Patent No.: US 10,348,718 B2
(45) Date of Patent: Jul. 9, 2019

(54) SHARING CREDENTIALS AND OTHER SECRET DATA IN COLLABORATIVE ENVIRONMENT IN A SECURE MANNER

(71) Applicant: Oracle International Corporation, Redwood Shores, CA (US)

(72) Inventor: Dhiraj D. Thakkar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 272 days.

(21) Appl. No.: 15/473,498

(22) Filed: Mar. 29, 2017

(65) Prior Publication Data

US 2018/0077142 A1 Mar. 15, 2018

Related U.S. Application Data

(60) Provisional application No. 62/394,664, filed on Sep. 14, 2016.

(51) Int. Cl.
*H04L 29/06* (2006.01)
*G06F 21/00* (2013.01)
(Continued)

(52) U.S. Cl.
CPC .......... *H04L 63/0807* (2013.01); *G06F 21/00* (2013.01); *H04L 9/088* (2013.01); *H04L 9/3213* (2013.01); *H04L 63/104* (2013.01)

(58) Field of Classification Search
USPC ...................................................... 726/9, 23
See application file for complete search history.

(56) References Cited

U.S. PATENT DOCUMENTS 8,321,923 B2 * 11/2012 Mahalal .............. G06F 21/6218
705/65
8,356,336 B2 * 1/2013 Johnston ................. H04L 63/08
726/12

(Continued)

OTHER PUBLICATIONS

Kerberos (see Wikipedia) (https://en.wikipedia.org/wiki/Kerberos_(protocol))—8 pages.

(Continued)

*Primary Examiner* — Amare F Tabor
(74) *Attorney, Agent, or Firm* — Trellis IP Law Group, PC

(57) ABSTRACT

A system and method for facilitating sharing of credentials and other secret data in a networked computing environment. An example embodiment provides for access to data of an external data source by a software application, wherein the external data source requires use of credentials to allow access to the data, but where the credentials themselves are not to be supplied to the software application. An example method includes storing the credentials in a secure data store; providing a token to the application, the token associated with the credentials and with an indication of the external data source; transferring the token from the application to a secure connector; using the secure connector and the token to retrieve the credentials from the secure data store to the secure connector; using the secure connector and the credentials to request data from the external data source to the secure connector before transfer of the requested data to the application via the secure connector.

17 Claims, 8 Drawing Sheets

(51) Int. Cl.
*H04L 9/08* (2006.01)
*H04L 9/32* (2006.01)

(56) References Cited

U.S. PATENT DOCUMENTS

| | | | | | |
|---|---|---|---|---|---|
| 8,423,651 | B1* | 4/2013 | Grieve | | G06F 9/54 |
| | | | | | 709/227 |
| 8,544,068 | B2* | 9/2013 | Yates | | H04L 63/101 |
| | | | | | 726/21 |
| 8,843,997 | B1* | 9/2014 | Hare | | H04L 63/0281 |
| | | | | | 709/200 |
| 9,038,138 | B2* | 5/2015 | Trammel | | H04L 9/3213 |
| | | | | | 713/187 |
| 9,256,722 | B2* | 2/2016 | Saxman | | G06F 21/33 |
| 9,871,778 | B1* | 1/2018 | Taralika | | H04L 63/08 |
| 2008/0059798 | A1* | 3/2008 | Fedronic | | G07C 9/00103 |
| | | | | | 713/172 |
| 2013/0111004 | A1* | 5/2013 | Mutton | | H04L 63/104 |
| | | | | | 709/223 |
| 2014/0026193 | A1* | 1/2014 | Saxman | | G06F 21/33 |
| | | | | | 726/4 |
| 2014/0317716 | A1* | 10/2014 | Chao | | H04L 63/10 |
| | | | | | 726/9 |
| 2014/0373099 | A1* | 12/2014 | Durbha | | H04L 63/10 |
| | | | | | 726/4 |

OTHER PUBLICATIONS

Single Sign-On technologies (see Wikipedia), e.g., XOpen SSO PAM. (https://www.uoguelph.ca/ccs/security/internet/single-sign-sso/benefits)—2 pages.
Pluggable Authentication Module (PAM) (-see Wikipedia article for references at the bottom-), e.g., JaaS. (https://en.wikipedia.org/wiki/Java_Authentication_and_Authorization_Service).—5 pages.
Secret Sharing Made Short—Hugo Krawczyk—IBM T .J. Watson Research Center—(http://www.cs.cornell.edu/courses/cs754/2001fa/secretshort.pdf)—11 pages.
Stoken—software token for cryptographic authentication—(http://manpages.ubuntu.com/manpages/wily/man1/stoken.1.html)—7 pages.

* cited by examiner

SHARING CREDENTIALS AND OTHER SECRET DATA IN COLLABORATIVE ENVIRONMENT IN A SECURE MANNER

CROSS REFERENCES TO RELATED APPLICATIONS

This application claims priority from U.S. Provisional Patent Application Ser. No. 62/394,664, entitled SHARING CREDENTIALS AND OTHER SECRET DATA IN COLLABORATIVE ENVIRONMENT IN A SECURE MANNER, filed on Sep. 14, 2016 which is hereby incorporated by reference as if set forth in full in this application for all purposes.

This application is related to the following application, U.S. Provisional Application Ser. No. 62/395,341, entitled SYSTEM FOR PROCESS CLOUD SERVICE, filed on Sep. 15, 2016, which is hereby incorporated by reference as if set forth in full in this application for all purposes.

BACKGROUND

The present application relates to computing, and more specifically to use of software tokens to facilitate securely conveying information in a computing environment.

Systems and methods involving sharing and/or using confidential or secret information among computing devices, software applications, and/or other computing environment resources are employed in various demanding applications, including collaborative enterprise, software development, social networking, and other applications. Such applications often demand efficient mechanisms for selectively sharing or exchanging information without compromising authentication credentials that may be required to access the information.

Efficient and secure mechanisms for selectively conveying information between users and/or computing resources of a computing environment can be particularly important in cloud-based enterprise computing environments, which often involve extensive collaboration between users, and may frequently require exchange of confidential information between many users and/or software applications and databases.

Typically, confidential information is only accessible to a particular enterprise user or software application after the user and/or software application supplies authentication credentials for authentication, i.e., after identity verification and determination of associated privileges for accessing, saving, or otherwise using data and/or functionality associated with the confidential information.

Conventionally, to retrieve or save secure data, a software application used in a networked computing environment may employ a secure connection to an external server. The secure connection, i.e., a connection requiring authentication, is often established using authentication credentials, e.g., username and password or authentication certificate, whereby the software application uses the credentials to log into the external server to set up a secure computing session between the software application (e.g., browser) and the external server.

Accordingly, a software user (e.g., software developer) with access to such authentication information will often input the authentication information into a software application to enable user access to data and/or functionality associated with the authentication information and associated account.

However, in certain scenarios, e.g., in certain collaborative cloud computing environments, the user may wish to share information that is accessible via the supplied authentication information, but without sharing or disclosing the authentication information. Conventionally, efficient mechanisms for enabling a user and/or software application to selectively share such data and/or functionality are severely limited.

SUMMARY

An example method facilitates sharing secure access to data and/or functionality while keeping authentication information (e.g., specific account credentials used for the secure access) secret. The example method includes determining a token, the token having been preassociated with one or more account credentials and an identification of a data provider that hosts the account associated with the account credentials; receiving, at a software application (e.g., a collaborative enterprise application) a name of the token; delivering, from the software application to a secure connector, the token name and a request to access data that is maintained by the data provider; employing the secure connector to use the token name to obtain the account credentials and identification of the data provider; and providing the account credentials from the secure connector to the data provider so as to fulfill the request to access data.

In a more specific embodiment, the example method further includes using the token name to retrieve the account credentials and identification of the data provider from a secure data store. The token information may be specified by an account holder of an account to which the token information applies. The token information includes the account credentials and the indication of the data provider that maintains or hosts the account.

The step of determining a token may further include receiving, at the software application, a listing of one or more tokens maintained by the secure data store and accessible for viewing by the software application via the secure connector. The listing of one or more tokens has been setup by one or more users of the secure data store and/or via another software application or component in communication with the secure data store.

In the specific embodiment, the step of receiving may further include employing a token viewer to access a listing of one or more tokens, the listing of one or more tokens including a listing of one or more token names and one or more token descriptions characterizing or associated with the one or more token names.

The step of employing the secure connector further includes implementing a token process that includes: using the token name to access the secure data store to retrieve the one or more account credentials and the identification of the data provider associated with the token name; verifying that the data provider pertaining to the request to access data of the data provider matches the data provider indicated by the token information associated with the token name. The token name is received by the secure connector from the software application in association with the request to access data of the data provider.

The example token process further includes logging each use of the token, and monitoring token usage for any unauthorized use of the token. The token process further includes ensuring that the software application issuing the request to access the data of the data provider is authorized to access the secure connector by authenticating the software application before allowing access by the software application to the secure connector. The token process may further include ensuring that the software application issuing the request to access the data of the data provider is authorized (e.g., as indicated via a token policy associated with the token) to use the token name to access the data of the data provider using the token.

Accordingly, certain embodiments discussed herein address the need to share data from an authenticated account or session with other enterprise applications and/or users or user sessions, but without exposing authentication information, e.g., account credentials used to authenticate the account. In other words, certain embodiments enable selective sharing of and use of credentials (for use by a software application and/or user session thereof) without exposing the credentials themselves to the software application or other user.

This is accomplished, in part, via novel use of a secure connector, which interfaces the software application and the data store, and facilitates selective retrieval of credentials from the data store by using a token that has been given to the software application for use in accessing the data from the data provider.

Accordingly, the software application need not connect directly to the data provider, but instead via the secure connector, which acts as a communications interface or intermediary between the requesting software application and the data provider. The secure connector ensures that credentials are only sent to the data provider for which the credentials are associated. Furthermore, by logging all usage of a particular token, the secure connector facilitates auditing and monitoring of token usage to ensure that no unauthorized access to the data provider using a token is allowed.

A further understanding of the nature and the advantages of particular embodiments disclosed herein may be realized by reference of the remaining portions of the specification and the attached drawings.

DETAILED DESCRIPTION OF EMBODIMENTS

Figure 1:
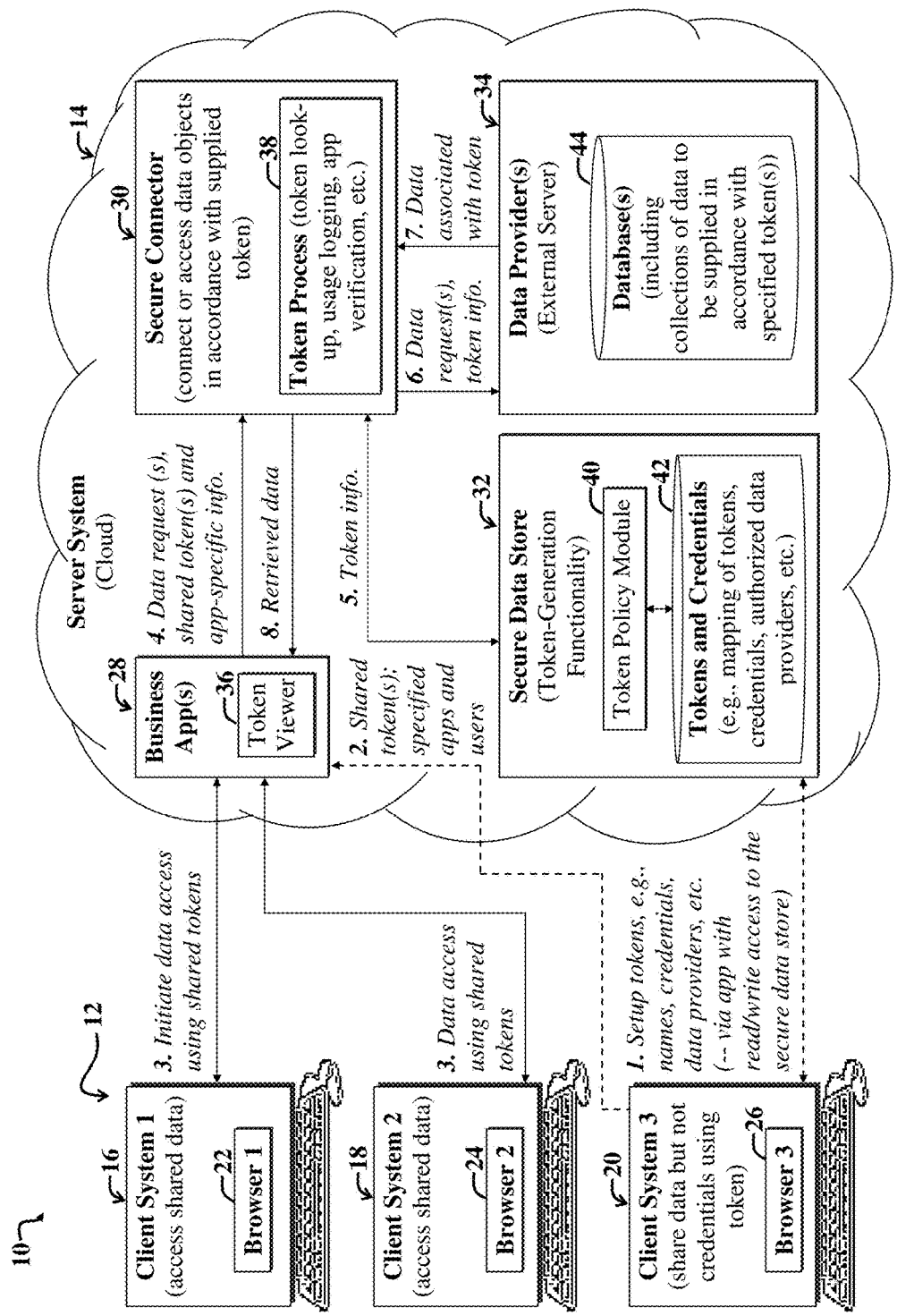
FIG. 1 is first a block diagram illustrating a first example system and accompanying environment configured to facilitate selective sharing of selected portions of secret data among selected network users and computing resources without sharing or revealing authentication information, i.e., credentials.

Many software applications, e.g., collaborative networked enterprise applications, may benefit from the ability to make a secure connection to one or more external servers so as to get and/or save data. For the purposes of the present discussion, a secure connection may be any connection that requires some form of authentication to verify the identity of a client.

For example, a cloud-based software development application may provide a shared collaborative development environment involving multiple actors, e.g., users and associated software applications and/or accompanying secure computing sessions. If a software application must connect to a secure external server, then the software application may require access to authentication information, e.g., credentials or a certificate, to authenticate and establish a secure connection with the external server.

In such a computing environment, a developer or other user with access to such authentication information can input the credentials or certificate into the software application. However, various use cases may require that the credentials or certificate, i.e., authentication information, be supplied in such a way that another specified collaborator can use the credentials but cannot view the credentials.

Accordingly, various embodiments discussed more fully below provide systems and methods enabling securing of such authentication information, yet allowing an application or user session to use such information when needed and when authorized by a token policy set up by a creator of the token and accompanying policy. In other words, various systems and methods discussed herein meet the need for efficient mechanisms for securing such authentication information, yet selectively allowing a software application and/or user session to use the authentication information to access data and/or functionality associated therewith.

Accordingly, various embodiments discussed more fully below relate to the use of tokens to facilitate data access by a software application, i.e., relate to use of selectively shared tokens to enable a software application to access data from a database in accordance with information associated with the shared tokens.

For the purposes of the present discussion, a token may be any string of one or more characters that can be used to look up metadata, e.g., credentials and/or other authentication information, which can in turn be used to access data and/or functionality from a database and/or other software application. Accordingly, the terms "token name" and "token" may be employed interchangeably herein, as the token name may itself be the token. Note that the term "token" as used herein is different than a conventional software token, which may refer to a type of security device in the field of cryptography used for two-factor authentication.

Furthermore, note that the term "shared secret" as used in the field of cryptography may be conceptually related to tokens, as discussed herein, with the exception that a "shared secret" typically refers to a mechanism used to encode a key to decode a communications link (i.e., messages transferred thereby), as opposed to encode access to credentials for an account that maintains sought data by a software application.

For the purposes of the present discussion, the term "token information" may refer to information, also called metadata (i.e., information about or associated with data) herein, that is associated with a particular token name and/or descriptor. Examples of token information include credentials or other authentication information associated with a token name; an indication of a data provider (where use of the token is to be restricted to the data provider); a listing identifying software applications and/or user sessions that are authorized to use the token, and so on.

Accordingly, the term "token information" is often used herein to refer to a combination of endpoint information (wherein the endpoint refers to a particular data provider) and credentials (where the credentials refer to authentication information). Generally, a token discussed herein will be associated with a particular set of one or more credentials and one or more endpoints, e.g., data providers. Note that a copy of a token or token name is also called "the token" herein.

Accordingly, a token, as the term is used herein, is related to a "shared secret," as the term is used in the field of cryptography. However, instead of using the shared secret (as the term is commonly used in the field of cryptography) to reference a cryptgraphical key used to encode a communications link, the "token," as the term is used herein, references token information that may include particular account credentials used to access data and/or functionality of a particular account that would otherwise require a user to input credentials, e.g., username and password, to enable access to data and/or functionality of the account, e.g., via a secure session.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software," "enterprise application," and "business application" may be employed interchangeably herein. However, an enterprise application may include one or more enterprise software modules or components, such as UI software modules or components.

Software functionality may be any function, capability, or feature, e.g., stored or arranged data, that is provided via computer code, i.e., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

For clarity, certain well-known components, such as hard drives, processors, operating systems, power supplies, routers, Internet Service Providers (ISPs), identity management systems, workflow orchestrators, process schedulers, integration brokers, Tenant Automation Systems (TASs), OnLine Analytical Processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 is first a block diagram illustrating a first example system 10 and accompanying computing environment configured to facilitate selective sharing of selected portions of secret data (e.g., data maintained via the database 44) among selected network users (e.g., users of client systems 12) and computing resources (e.g., business application 28 and client systems 12) without sharing or revealing authentication information, i.e., credentials.

For the purposes of the present discussion, a computing resource may be any component, mechanism, or capability or quantities thereof of a computing environment, including, but not limited to, processors, memories, software applications, user input devices, and output devices, servers, and so on. A user of a computing resource may be a person or may be another computing resource, e.g., software application.

The example system 10 includes plural client devices 12 in communication with a server system 14 via a network, e.g., the Internet. The server system 14, also called a cloud herein, hosts one or more enterprise applications 28. The enterprise applications 28 may be cloud-based collaborative applications. As such, the one or more enterprise applications 28 incorporate functionality for enabling multiple collaborators, e.g., users of the client systems 12, to log into the enterprise applications 28 and participate in one or more computing sessions that enable collaboration on selected portions of shared data.

A computing session may be any instance of a dialog or information exchange between computing devices or software applications, wherein one or more of the computing devices or software applications have provided authentication credentials or login information (e.g., username and password) of a user of one or more of the computing devices to initiate the computing session. The terms "computing session" and "session" may be employed interchangeably herein.

For the purposes of the present discussion, a cloud-based application may be any application that runs on one or more servers, e.g., Server Oriented Architecture (SOA) servers, which are coupled to or otherwise included in the Internet or other network. A server may be any computing resource, such as a computer and/or software, which is adapted to provide content, e.g., data and/or functionality, to another computing resource or entity that requests it, i.e., the client. A client may be any computer (e.g., client systems 12) or software application (e.g., browsers 22-26)) that is adapted to receive content from another computer or software application, called a server. An SOA server may be any server that is adapted to facilitate providing services or subprocesses accessible to one or more client computers coupled to a network.

In the present example embodiment, the client systems 12 include three example client systems 22-26, and in particular, a first client system 16 and accompanying first browser 22, a second client system 18 and accompanying second browser 24, and a third client system 20 and accompanying third browser 26. The client systems 16-20 may be implemented via computers, e.g., desktop computers, laptops, tablets, smartphones, and so on. The browsers 22-26 enable collaborators, e.g., operators of the client systems 16-20, to browse a network (e.g., by entering Uniform Resource Locators (URLs)) to access webpages and web applications enabling access the business application(s) 28 and functionality thereof.

Note that while only browsers 22-26 are shown running client side, that other types of client-side software may be included. For example, the business application(s) 28 may leverage browser plugins or other client-side scripts or programs that are configured to work with the business application(s) 28, without departing from the scope of the present teachings.

In the present example embodiment, the server system 14 further hosts one or more data providers 34 and accompanying database(s) 44. A secure connector 30 interfaces that enterprise application(s) 28 and the data provider(s) 34 to facilitate securely and selectively sharing secure data maintained via the database(s) 44 of the data provider(s) 34, as discussed more fully below.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the data provider(s) 34 may be hosted on a separate cloud or server system from the server system 14 used to host the enterprise application(s) 28. Furthermore, in certain implementations, the secure data store 32 may be integrated within the secure connector 30. Furthermore, additional interfaces and/or software applications (other than those shown), e.g., for enabling authorized user access to the secure data store 32, may be included, without departing from the scope of the present teachings.

For the purposes of the present discussion, secure data of a data provider and/or accompanying database may be any data that requires authentication to enable data access. Similarly, a data provider that selectively provides secure data is called a secure data provider.

Authentication may involve the submittal of authentication information, e.g., one or more credentials to enable data access, e.g., as part of a secure session established (between a client and a data provider) in response to the submittal of the one or more credentials from a client. Accordingly, a secure session may be any computing session that requires submittal of authentication information to initiate the computing session. Authentication information may be any information usable to verify the identity of a client, e.g., a user, software application, and/or computing device that will participate in a secure session.

Note that while various embodiments discussed herein provide mechanisms for enabling the sharing of access to secure data, embodiments are not limited thereto. For example, in certain implementations, the sharing of software functionality that may be afforded via establishment of a secure session may also be shared, and may include enabling the writing of data and/or modifying of data; not just viewing or copying of data.

The secure connector 30 communicates with the secure data store 32, which maintains a collection of tokens and associated credentials 42, which are in turn associated with one or more token policies 40. A token policy may specify, for example, that a particular token is only to be used to facilitate access to data of a specified data provider 34.

Note, however, that a token policy is not necessarily limited to specifying that a particular token be limited for use with a particular data provider. For example, in an illustrative implementation, the token policy 40 may further specify that a particular token only be usable by a particular user session of the business application 28 and/or by a particular business application 28.

The secure connector 30 includes a token process module 38, which includes code for receiving one or more tokens from the business application(s) 28; then using the one or more tokens to retrieve associated credentials 42 and token policy 40, e.g., via a token look-up process. The token process module 38 further includes code for ensuring compliance with the token policy 40 established for a particular token, e.g., ensuring that a particular token only be used to access data from a particular data provider specified via the token policy 40 and associated token map maintained in a tokens and credentials database 42 of the secure data store 32.

Note that in certain embodiments, a given token, i.e., token name and/or description, is stored in association with one or more account credentials (i.e., authentication information) and an identification of the applicable data provider(s) 34, as part of a token map for the token. The token process 38 may then communicate with the secure data store 32 to access the token map for a particular received token, and then retrieve, from the secure data store 32, account credentials and an indication of a permitted data provider 34 associated with the token name.

In the present example embodiment, the secure connector 30 communicates with the secure data store 32 via a secure session. The secure session may be established upon submittal from the secure connector 30 of validated authentication information to the secure data store 32.

Note that a particular secure session may have account privileges associated therewith. For example, certain authentication credentials may enable read and write access, whereas other credentials may enable only read access, as discussed more fully below.

In an example use case scenario, a user of the third client system 20 represents an account holder, i.e., one who holds account credentials for accessing a particular portion of the database 44 of the data provider 34 that is associated with the user by virtue of the credentials and corresponding account. Users of the first client system 16 and the second client system 18 may be collaborators working with the enterprise application(s) 28 and wishing to access secure data of the database 44 to be shared by the account holder using the third client system 20. The account holder, i.e., user of the third client system 20 (also called the third user herein) may also be a collaborator that has access to the enterprise application(s) 28.

Initially, the user of the third client system 20 browses to a website to access a web application that enables authorized access to the secure data store 32 (e.g., by enabling logging into the secure data store 32 in response to authenticated credentials) to facilitate setting up tokens. Note that the web application enabling read/write access to the secure data store 32 may be incorporated into the secure data store 32. Alternatively, a separate web application may be employed. Furthermore, the web application may be implemented as a component of the enterprise application(s) 28, without departing from the scope of the present teachings.

Note that even if the web application used to enable the user of the third client system 20 to access the secure data store 32 is implemented as a component of the enterprise application(s) 28, that users of the first client system 16 and second client system 18 will not have access to the secure data store 32 (or portions thereof that are not to be shared, e.g., the credentials of the user of the third client system 20) unless those users supply requisite authentication information, i.e., credentials for accessing the secure data store 32. Furthermore, even if one of the collaborators using the first client system 16 or the second client system 18 supply credentials to access and/or write to the secure data store 32, those credentials may be unique to that particular collaborator and need not be shared with other collaborators to enable selective sharing of data associated therewith and maintained via the data provider(s) 34.

For the purposes of the present discussion, a web application may be any software application, e.g., a server-side application, which may be accessed via one or more clients, e.g., a browser running on a computing device coupled to a network, such as the Internet.

In accordance with the present example scenario, the user of the third client system 20 browses to the secure data store 32 and/or other web application associated therewith, to begin setting up a token and corresponding associations, e.g., associations with credentials for accessing the data provider(s) 34 and accompanying data of the database(s) 44, and token associations with the specified data provider(s) 34.

When setting up a token, the third user (account holder) may specify or enter a token name (also simply called the token herein); provide a description of the token; specify one or more credentials usable to access a portion of the data of the database 44 (where the portion represents a portion to which the account holder's credentials enable access to); and identify a data provider 34 for which the one or more credentials apply. Such setup information for a given token is maintained in a tokens and credentials database 42 as a token map.

Each token map may be governed by a token policy module 40. The token policy module may include computer code for enabling an authorized account holder to specify how a particular token shall be used and shall not be used. For example, the third user may configure the token policy maintained by the token policy module 40 to ensure that a particular token can only be used by a specified user session of the enterprise application(s) 28, or that the token and token description not be accessible via a token viewer 36 of the enterprise application(s) 28, as discussed more fully below.

After the user of the third client system 20 sets up the tokens, i.e., provides a token name, associated credentials, and associated data provider, then the token may be delivered by the third user to the enterprise application(s) 28, and/or to the secure connector 30, or otherwise made available via the token viewer 36 of the enterprise application(s) 28.

Note that while the token viewer 36 is shown as part of the enterprise application(s) 28, that the token viewer 36 may be implemented as a separate application or web service that has been granted read access to selected token information available via the secure connector and/or otherwise input into the token viewer 36 via the account holder, i.e., user of the third client system 20.

Note that the secure connector 30 has been authenticated at the secure data store 32, such that the secure connector has read access to both tokens (i.e., token names) and associated token data, e.g., associated token credentials, indicated data provider, and so on. Accordingly, in one embodiment, the token viewer 36 is authenticated for read access to token name and description data via the secure connector 30. In this case, the secure connector 30 selectively provides a listing of token names and, optionally, additional token descriptions (but no associated credentials) to the token viewer 36 in response to a request for such a listing from the enterprise application(s) 28 and sent to the secure connector 30.

In another embodiment, the third user, i.e., account holder directly inputs token names and descriptions into a UI for the token viewer; thereby enabling other collaborators (e.g., users of the first client system 16 and the second client system 18) to access the token viewer 36 and selectively use one or more of the tokens provided by the third user, i.e., user of the third client system 20.

In the present example scenario, after one or more tokens are made available to the enterprise application(s) 28, the enterprise application(s) 28 may use the tokens to access data of the database(s) 44 maintained by the data provider(s) 34, by delivering one or more of the tokens to the secure connector 30 in association with one or more data request messages.

For example, in one scenario, an enterprise application 28 seeking data from the data provider 34 (the data of which is associated with a particular token and credentials for accessing the data) simultaneously issues a request message with the token, i.e., such that the request message includes the token. Alternatively, the token is sent first to the secure connector 30, to enable the secure connector to establish a secure session with the data provider 34 for use by the requesting enterprise application 28.

The secure connector 30 uses the token (i.e., token name) sent by the business application(s) 28 to the secure connector 30 to facilitate retrieval of data from the data provider(s)

34 and delivery of the data to the enterprise application(s) 28 in response to the request. The secure connector 30 facilitates the data delivery (responsive to the data request received from the business application(s) 28 in association with a token) by implementing the token process 38.

The token process 38 includes computer code for implementing a token loop-up process at the secure data store 32. The token look-up process includes accessing a token map, i.e., credentials and specified data provider 34, for a particular token received by the secure connector 30 from the business application(s) 28 in association with a request to access data of the database(s) 44, wherein the request is issued by the enterprise application(s) 28.

The credentials and indication of the specified data provider 34 are then retrieved by the secure connector 30 and used thereby to log into and retrieve the requested data from the database(s) 44. The retrieved data is then forwarded to the requesting business application(s) 28 in accordance with the request and associated token received by the secure connector 30 from the enterprise application(s) 28.

In a more specific example use case scenario, users of the first client system 16 and the second client system 18 are involved in the design of a business application. The user of the third client system 20 has credentials to connect to the data provider 34 (e.g., https://www.acme.com/shipping). The business application 28 needs access to data from the data provider 34, e.g., to verify or gain information pertaining to a shipping label. Nether user of the first client system 16 or second client system 18 have credentials to access the data provider 34, and the user of the third client system 20, who does have access to credentials needed to access the data provider 34, does not wish to share the credentials with either user of the first client system or second client system 18.

Accordingly, the third user (i.e., the user of the third client system 20) logs into and enters the credentials into the secure data store 32. The third user sets a token policy specifying that the credentials only be sent to the specified data provider (e.g., https://acme.com/shipping). The secure data store 32 then generates a token and accompanying associations (e.g., associations with credentials and the indicated data provider) in accordance with the input of the third user. The token name may be, for example, T1, which is to be used by the enterprise application(s) 28. The third user then shares T1 with the enterprise application(s) 28, and in particular with the user (user 1) of the first client system 16 and the user (user 2) of the second client system 18, i.e., user sessions and/or credentials associated therewith.

The enterprise application 28 will not be allowed to access data from the secure data store 32 (i.e., credentials of the user of the third client system 20 used to access data of the database(s) 44 maintained by the specified data provider 34). This prevents user 1 and user 2 from accessing or viewing the credentials associated with the token, which are maintained at the secure data store 32.

Then the enterprise application 28 is running and attempts access to data from the data provider 34, the enterprise application 28 delegates the request to the secure connector 30 and passes the token (i.e., "T1") to the secure connector 30. The enterprise application 28 also passes application-specific information identifying the particular enterprise application 28 along with the token to the secure connector 30. The application-specific information enables the secure connector 30 to confirm that the enterprise application 28 is authenticated and has permissions at the secure connector 30 to use the token (T1) to retrieve associated data from the data provider 34, e.g., in accordance with a token policy 40 for that token, as maintained at the secure data store 32.

The secure connector 30 then implements the token process 38 and looks up the token T1 at the secure data store 32 and retrieves the associated credentials and indication of the associated data provider 34.

The secure connector 30 then connects to the data provider 34 (e.g., https://www/acme.com/shipping) and passes the credentials and application-specific data associated with the token T1 to the data provider 34 and also requests data from the data provider on behalf of the enterprise application 28 and in accordance with the data request issued by the enterprise application 28.

Upon acceptance of the provided credentials (i.e., credentials associated with the token T1), the data provider 34 provides requested data from the database 44 back to the secure connector 30. The secure connector 30 then delivers the data to the enterprise application 28 to fulfill the data request made thereby.

Accordingly, use of the secure connector 30 and tokens as discussed therein obviate the need for enterprise application(s) 28 to connect directly to the data provider(s) 34. The secure connector 30 and accompanying token process 38 ensure that the credentials associated with a token are only sent to the data provider specified, e.g., by the token policy 40. The secure connector 30 and accompanying token process 38 log all usage of the token (T1), e.g., for auditing and monitoring purposes, thereby enabling the token process 38 to facilitate ensuring that the business application 28 is not performing any unauthorized transactions.

Accordingly, certain embodiments discussed herein obviate the need, when sharing secure data, to share credentials, e.g., with the business application(s) 28, which might allow unauthorized users or processes to access and use the credentials and associated data and/or functionality.

Use of tokens, as discussed herein enable other collaborators to view tokens, i.e., token names and/or descriptions, without compromising the associated credentials. A token policy 40 can identify a data provider for which the supplied credentials for a token are valid.

Hence, by enabling the setting up of tokens in such a way, users that wish to share data from a secure session may do so without sharing the credentials that the user employs to login and access the information. In addition, in certain implementations, by providing token-setup functionality as discussed herein, a user may specify with particularity which subsets of data and which associated functionality (and permissions) will be usable by entities with which the information and/or functionality is shared.

Figure 2:
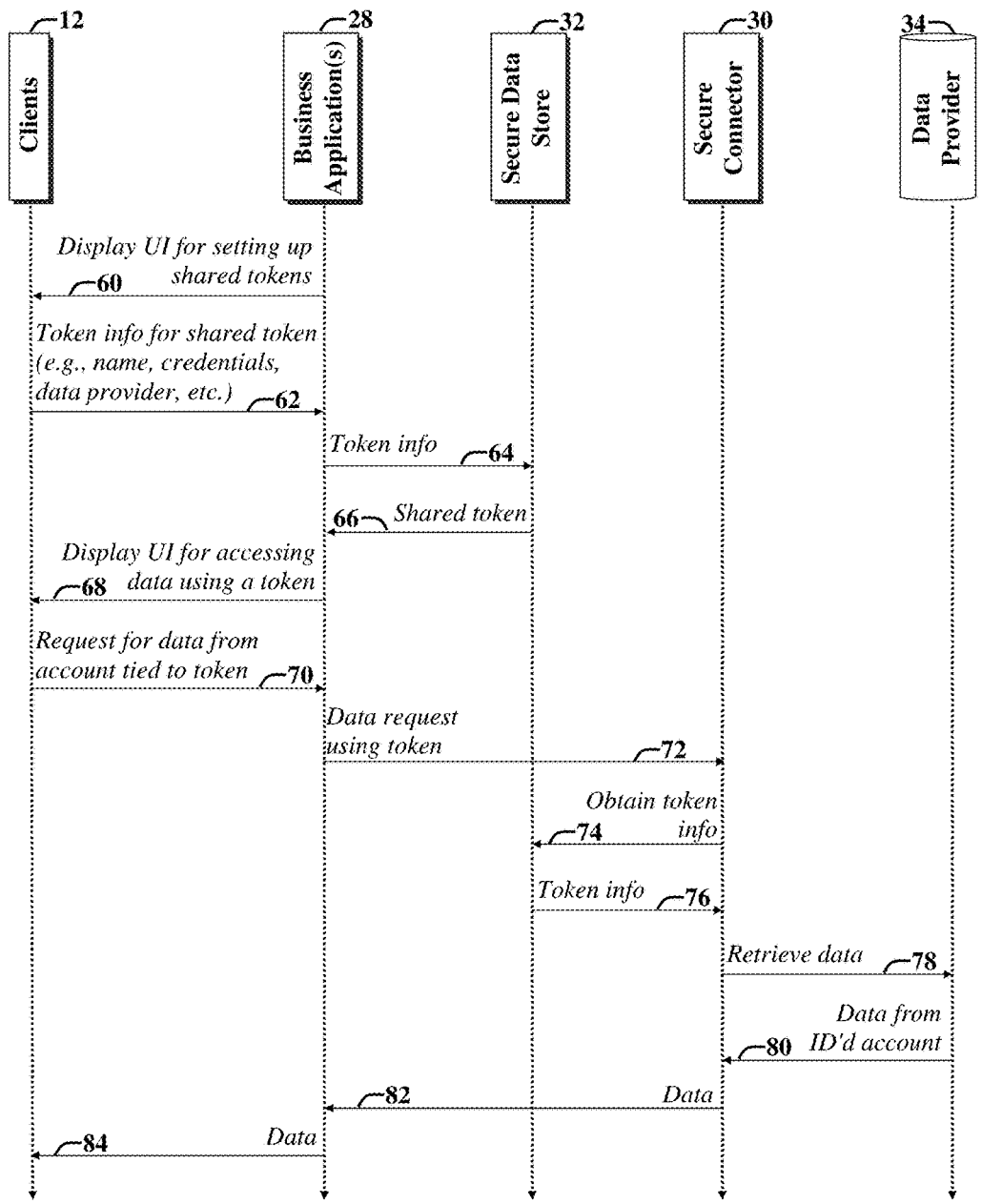
FIG. 2 is an example sequence diagram illustrating example communications between modules of the system of FIG. 1, whereby the secure connector acts as an interface between a data provider and one or more enterprise applications used to access secret data in a backend database of the data provider.

FIG. 2 is an example sequence diagram illustrating example communications between modules 12, 28-34 of the system 10 of FIG. 1, whereby the secure connector 30 acts as an interface between a backend database 34 and one or more enterprise applications 28 used to access secret data in the backend database 34.

Note that while the data provider 34 is also referred to as "the database" herein, that the data provider 34 includes additional functionality beyond mere storage of data and includes a database management system and mechanism to authenticate communications therewith, e.g., by using credentials as may be supplied by the secure connector 30 via use of a token, as discussed herein.

With reference to FIGS. 1 and 2, in the present example embodiment, one of the clients 12, e.g., the client represented by the third client system 20 and accompanying browser 26 of FIG. 1 views a UI display screen for setting up tokens, the UI display screen rendering instructions 60 of which are received from the business application(s) 28 and viewable in an authenticated browser 26 of the clients 12.

Note that in the present example embodiment, the software for enabling securely logging into the secure data store 32 of FIG. 1 and providing functionality for facilitating defining tokens and token associations (e.g., associations with credentials, data providers, token policies, and so on) is implemented as a component of the enterprise application(s) 28. However, such software component may be implemented as a separate application, i.e., separate from the enterprise application(S) 28, without departing from the scope of the present teachings.

One of the clients 12 that has been authenticated to access the secure data store 32 and accompanying functionality for setting up tokens then issues token information 62 pertaining to the token and token associations to the component of the business application(s) 28 that has established a secure session with the data store 32 of FIG. 1. The component of the business application(s) 28 then forwards the token information 64 to the secure data store 32 via another secure connection therewith.

The secure data store 32 then provides the shared token 66 to one or more additional components and/or secure sessions of the business application(s) 28 (e.g., one or more preestablished sessions by collaborators, including a user of the first client system 16 of FIG. 1 and a user of the second client system 18 of FIG. 1). The shared tokens are viewable via the token viewer 36 to users who have been authorized to view the tokens in accordance with the token policy 40 of FIG. 1.

UI rendering information 68 for viewing tokens, e.g., via the token viewer 36 of FIG. 1 is then forwarded for display to the clients 12, which may include the first client system 16 and second client system 18 of FIG. 1.

Subsequently, one of the clients 12 issues a request for data 70 to the business application(s) 28, e.g., in response to a user employing a browser 22, 24 to browse to a page and select a UI control tied to the use of a particular token and associated data stored via the data provider 34 of FIG. 1. The business application(s) 28 then issue a data request 72 using a specified token. The data request 72 is delivered from the enterprise application(s) 28 to the secure connector 30.

The secure connector 30 then issues a token information request 74 to the secure data store 32, which responds by providing token information 76 pertaining to a specified token (e.g., as specified in the request 74). The retrieved token information 76 may include, for example, account credentials and an indication of the authorized data provider 34 for the token. In certain implementations, additional token policy information may also be provided via the token information 76 returned from the secure data store 32. Examples of additional token policy information include one or more indications of an authorized (to use the token) business application 28 and/or user sessions associated therewith.

The secure connector 30 then uses the retrieved token information 76 to log into and issue a request for data 78 from the data provider 34 in accordance with supplied credentials included among the token information 76. The data provider 34 then provides data 80 responsive to the request 78, wherein the data represents a subset of data afforded by the data provider 34 and applicable to an account associated with the credentials supplied via the token information 76.

The secure connector 30 then forwards the retrieved data 82, or portion thereof, to the business application(s) 28 in accordance with the token information 76 and any associated token policy. The resulting data 84 is then viewable via the one or more authorized clients 12, e.g., clients who have established user sessions with the enterprise application(s) 28, the user sessions of which have been authorized to view the retrieved data in accordance with a token policy setup during initial specification of a token and associated information (e.g., credentials, data provider, token policy, etc.).

Figure 3:
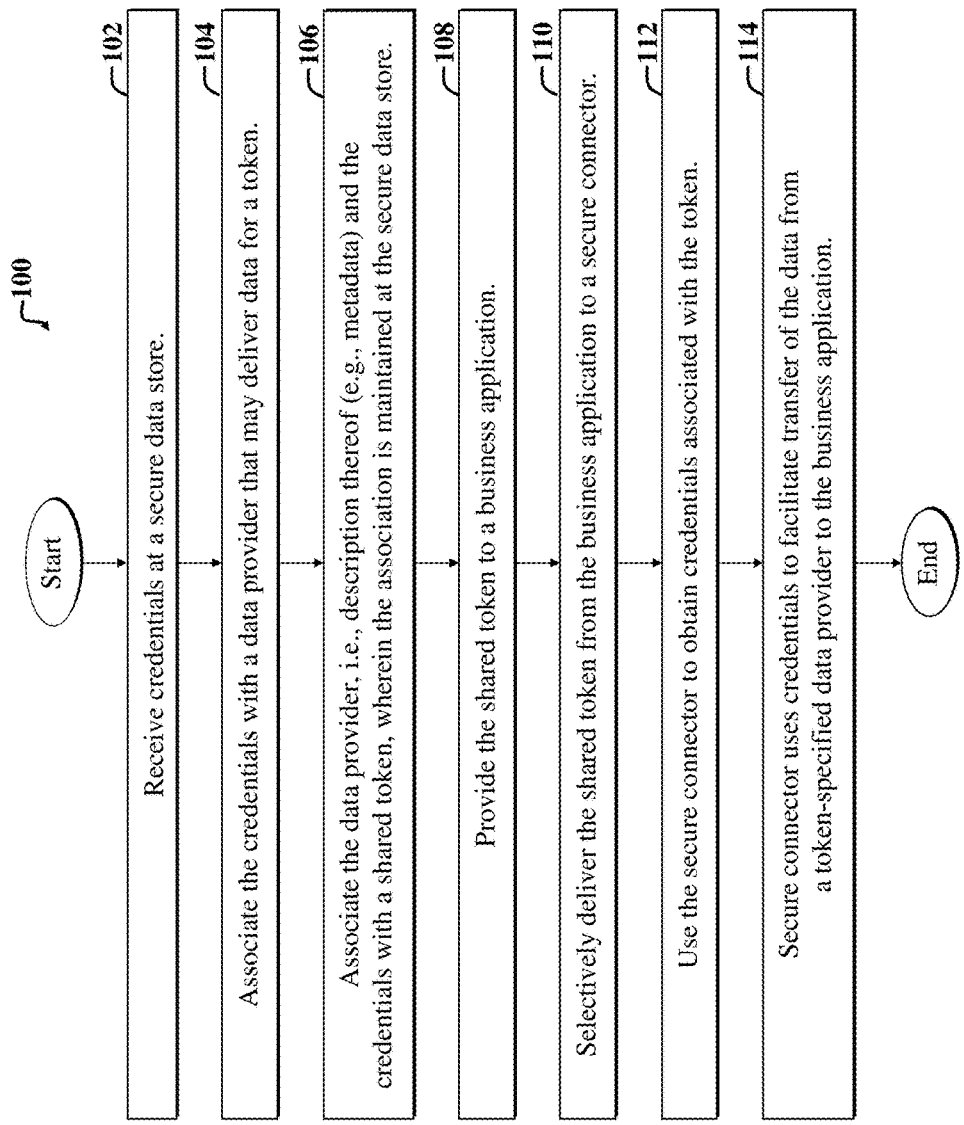
FIG. 3 is a flow diagram of a first example method implementable via the embodiments of FIGS. 1-2.

FIG. 3 is a flow diagram of a first example method 100 implementable via the embodiments of FIGS. 1-2. With reference to FIGS. 1 and 3, the first example method 102 includes an initial credentials-receiving step 102.

The initial credentials-receiving step 102 may be implemented in part via the third client system 20 and browser 26 of FIG. 1 in communication with the secure data store 32 of FIG. 1. The secure data store 32 receives credentials associated with a token during an initial token setup process.

Next, a credentials-association step 104 includes associating the credentials with a data provider and token (e.g., token name); the data provider (e.g., the data provider 34 of FIG. 1) of which may provide data associated with the credentials that are associated with the token.

Next, a data-provider-association step 106 includes associating the data provider, i.e., description thereof (e.g., metadata) and the credentials with the token to be shared (i.e., shared token). The association is maintained at the secure data store 32, along with other associations, e.g., associations that associate the shared token with one or more credentials and, optionally, an additional token policy.

Subsequently, in a token-sharing step 108, the shared token is then selectively shared (e.g., in accordance with a token policy) with one or more of the enterprise application(s) 28 of FIG. 1, and/or user sessions thereof.

Next, in a token-delivery step 110, the one or more enterprise application(s) 28 of FIG. 1 deliver the token, as needed, to the secure connector 30 when data associated with the token is sought by the one or more enterprise application(s) 28.

In a subsequent credentials-obtaining step 112, the secure connector 30 of FIG. 1 accesses the secure data store 32 to retrieve credentials necessary to access data of the data provider(s) 34.

Next, in a data transfer step 114, the secure connector 30 uses the credentials to facilitate transfer of the requested data (i.e., requested by the enterprise application(s) 28 using the token) from a token-specified data provider 34 to the requesting business application(s) 28 of FIG. 1.

Note that the first example method 100 may be modified, without departing from the scope of the present teachings. For example, an alternative method for for providing secure transmission of data between an application and an external data source (wherein the external data source requires credentials in order to authenticate a request for data), includes storing at least a portion of the credentials in a secure data store; providing a token to the application, the token associated with the at least a portion of the credentials and with an indication of the external data source; transferring the token to a secure connector; using the token to transfer the at least a portion of the credentials from the secure data store to the secure connector; using the at least a portion of the credentials to request data from the external data source to the secure connector; and transferring the requested data from the external data source to the secure connector, and from the secure connector to the application. The credentials may include, for example a username and password, and an indication of the external data source, e.g., the data provider 34 of FIG. 1.

Figure 4:
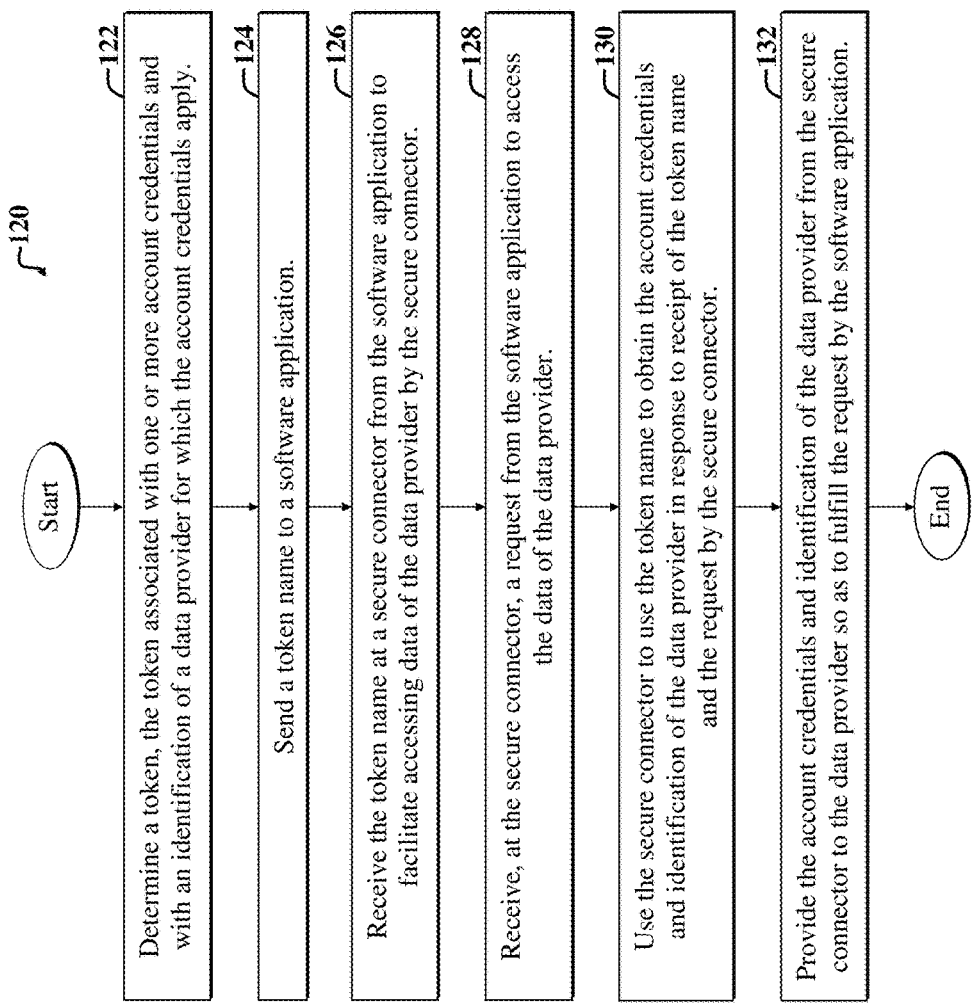
FIG. 4 is a flow diagram of a second example method implementable via the embodiments of FIGS. 1-2.

FIG. 4 is a flow diagram of a second example method 120 implementable via the embodiments of FIGS. 1-2. The second example method 120 facilitates sharing access to data and/or functionality, while keeping credentials used for the secure access secret.

The second example method 120 includes a first token-determining step 122, which includes determining (e.g., receiving a specification of, or otherwise obtaining) a token. The determined token has been preassociated with one or more account credentials and an identification of a data provider for which the account credentials apply, i.e., for which the account credentials enable access to data of the account.

In a subsequent token-sending step 124, the name of the token is sent or otherwise delivered (as representative of the token) to a software application, e.g., the collaborative enterprise application(s) 28 of FIG. 1.

Next, a token-receiving step 126 includes receiving the token name at a secure connector from the software application, so as to facilitate accessing data of the data provider by the secure connector.

In a subsequent request retrieving step 128, a data request pertaining to the token is sent from the software application to the secure connector. Note that steps 126 and 128 may occur approximately simultaneously in certain implementations, wherein the token and the data request are sent to the secure connector using the same request message. The token may be sent as a header of the request message.

In other implementations, the token is first used to establish a secure session, via the secure connector, between the software application and the data provider, where the secure connector acts as an intermediary or interface between the software application and the data provider, e.g., to ensure that credentials associated with the token are not exposed to a software application (or component) or user thereof that are not authorized to view or see the credentials. In such implementation, after the secure session is established, data requests and/or other permitted interactions (e.g., as permitted by the secure connector, token, and associated token policy) may transpire between the software application and the data provider.

Next, a secure-connecting step 130 involves the secure connector using the token name to obtain the account credentials and identification of the data provider in response to receipt of the token name and the request by the secure connector. The account credentials and identification of the data provider may be retrieved from a secure data store (e.g., the secure data store 32 of FIG. 1) via another secure session established between the secure connector and the secure data store.

Subsequently, in a credentials-supplying step 132, the account credentials and identification of the data provider are delivered from the secure connector to the data provider so as to fulfill the request by the software application. The secure connector uses the credentials to obtain, from the secure data provider, requested data, which is then delivered to the software application in accordance with the data request issued thereby to the secure connector.

Note that the second example method 120 may be modified, without departing from the scope of the present teachings. For example, the method 120 may be modified to further specify that the secure-connecting step 130 further includes using the token name to retrieve the account credentials and identification of the data provider from a secure data store.

The first token-determining step 122 may be modified to further specify that the step 122 further includes receiving token information specified by an account holder of an account to which the token information applies, wherein the token information includes the account credentials (e.g., username and password) and the indication of a data provider that maintains the account.

The token-determining step 122 may further include providing, to the software application, a listing of one or more tokens from the secure data store, wherein the listing of one or more tokens have been setup by one or more users of the secure data store and/or by another software application or component that is in communication with the secure data store and can supply read credentials to the secure data store sufficient to enable read access to token names and descriptions from the secure data store, and/or from the secure connector.

Accordingly, the token-sending step 124 may further specify employing a token viewer to access a listing of one or more tokens, wherein the listing of one or more tokens includes a listing of one or more token names and one or more token descriptions characterizing or associated with the one or more token names.

The secure-connecting step 130 may further specify implementing a token process that includes: using the token name to access the secure data store to retrieve the one or more account credentials and the identification of the data provider associated with the token name; verifying that the data provider pertaining to the request to access data of the data provider matches the data provider indicated by the token name, wherein the token name is received by the secure connector from the software application in association with the request to access data of the data provider; logging each use of the token; monitoring use of the token for any unauthorized use of the token; ensuring that the software application issuing the request to access the data of the data provider is authorized to access the secure connector; and ensuring that the software application issuing the request to access the data of the data provider is authorized to use the token name to access the data of the data provider using the token.

Figure 5:
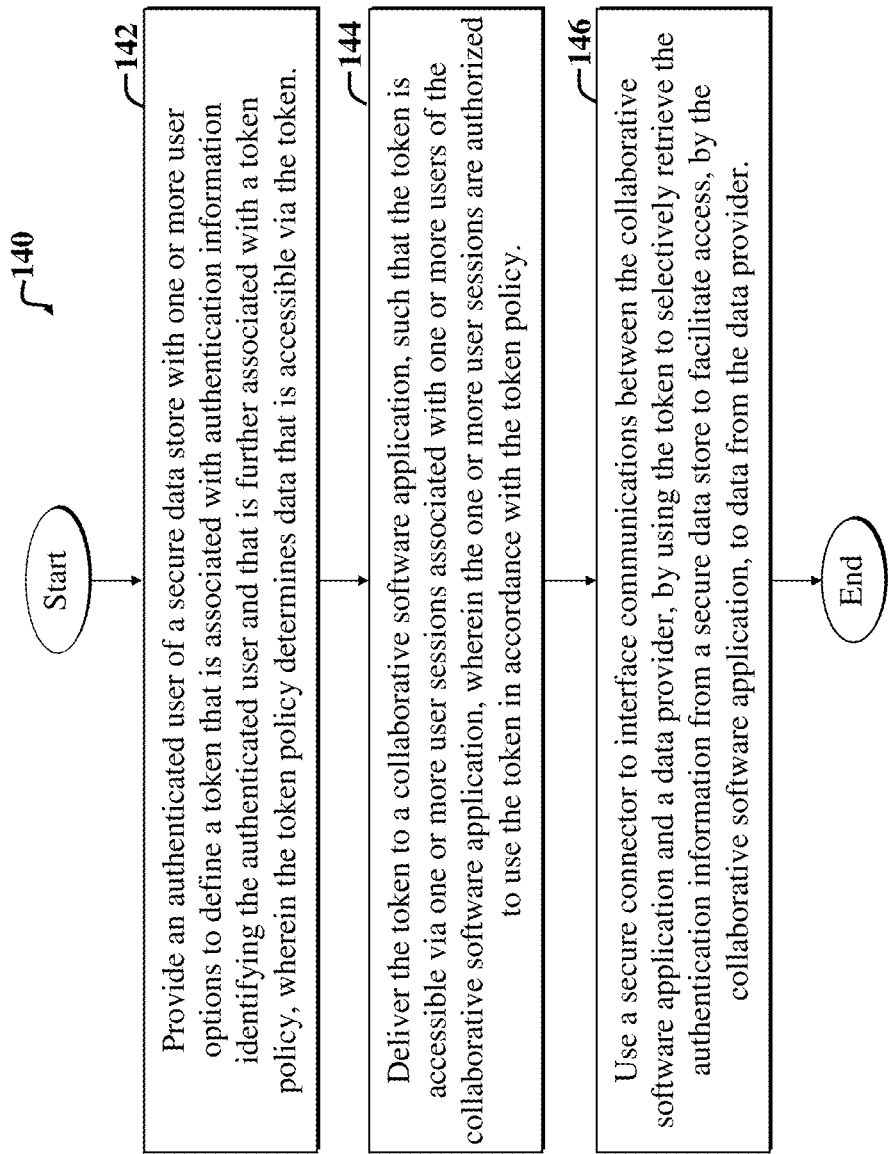
FIG. 5 is a flow diagram of a third example method implementable via the embodiments of FIGS. 1-2.

FIG. 5 is a flow diagram of a third example method 140 implementable via the embodiments of FIGS. 1-2. The third example method 140 represents a method for selectively sharing data among users of a collaborative software application in a networked computing environment, i.e., a computing environment that includes a network.

The third example method 140 includes a first token-defining step 142, which includes providing an authenticated user of a secure data store with one or more user options to define a token that is associated with authentication information identifying the authenticated user and that is further associated with a token policy, wherein the token indicates data that is accessible via the token. The one or more user options may be provided via a UI display screen displayable via the browser 26 of FIG. 1.

A subsequent token-delivering step 144 includes delivering the token to the collaborative software application, such that the token is accessible via one or more user sessions associated with one or more users of the collaborative software application, wherein the one or more user sessions are authorized to use the token in accordance with the token policy.

Next, a token-using step 146 includes using a secure connector to interface communications between the collaborative software application and a data provider, by using the token to selectively retrieve the authentication information from a secure data store to facilitate access, by the collaborative software application, to data from the data provider.

Note that the third method 140 may be modified or augmented, without departing from the scope of the present teachings. For example, the third example method 140 may further specify that the authentication information includes one or more credentials. For the purposes of the present discussion, a credential may be any item of information (e.g., username or password) usable to facilitate identifying a user or software application.

The third example method 140 may further specify that the data provider is configured to selectively provide the data that is accessible via the token to the secure connector in accordance with the token and authentication information retrieved by the secure connector in response to a request message from the collaborative software application that is requesting the data that is accessible via the token.

The third example method 140 may further specify a step of forwarding, from the secure connector and to the collaborative software application, data from a data provider, wherein the data from the data provider is accessible via the authentication information associated with the token.

A set of one or more UI display screens may be presented on a client device, wherein the one or more UI display screens present one or more user options (e.g., UI controls) to enable an authenticated user to define associations for the token, wherein defined associations for the token include an indication of data and/or functionality to be represented by the token or to otherwise be accessible to a client via secure connector that uses the token.

The third example method 140 may further specify that the authentication information includes one or more credentials that are stored separately from the collaborative software application in the secure data store. The secure connector may retrieve the one or more credentials from the secure data provider in response to the receipt of a token and accompanying request message from the collaborative software application.

The secure connector may be configured to ensure that the one or more credentials are only sent to the data provider from which the data accessible via the token is to be retrieved and not to the collaborative software application or to the one or more user sessions established via the collaborative software application.

The collaborative software application may include or represent a cloud-based enterprise application. The secure connector may maintain a usage log to enable logging or storing of one or more descriptors of usage of the token. The one or more descriptors of usage may include a number of times that the token was used by the collaborative software application to retrieve the data accessible via the token from the data provider. The secure connector to employ the usage log to monitor communications between the collaborative software application and the data provider for one or more signs of unauthorized access and to block the unauthorized access in response to detection of the one or more signs.

Figure 6:
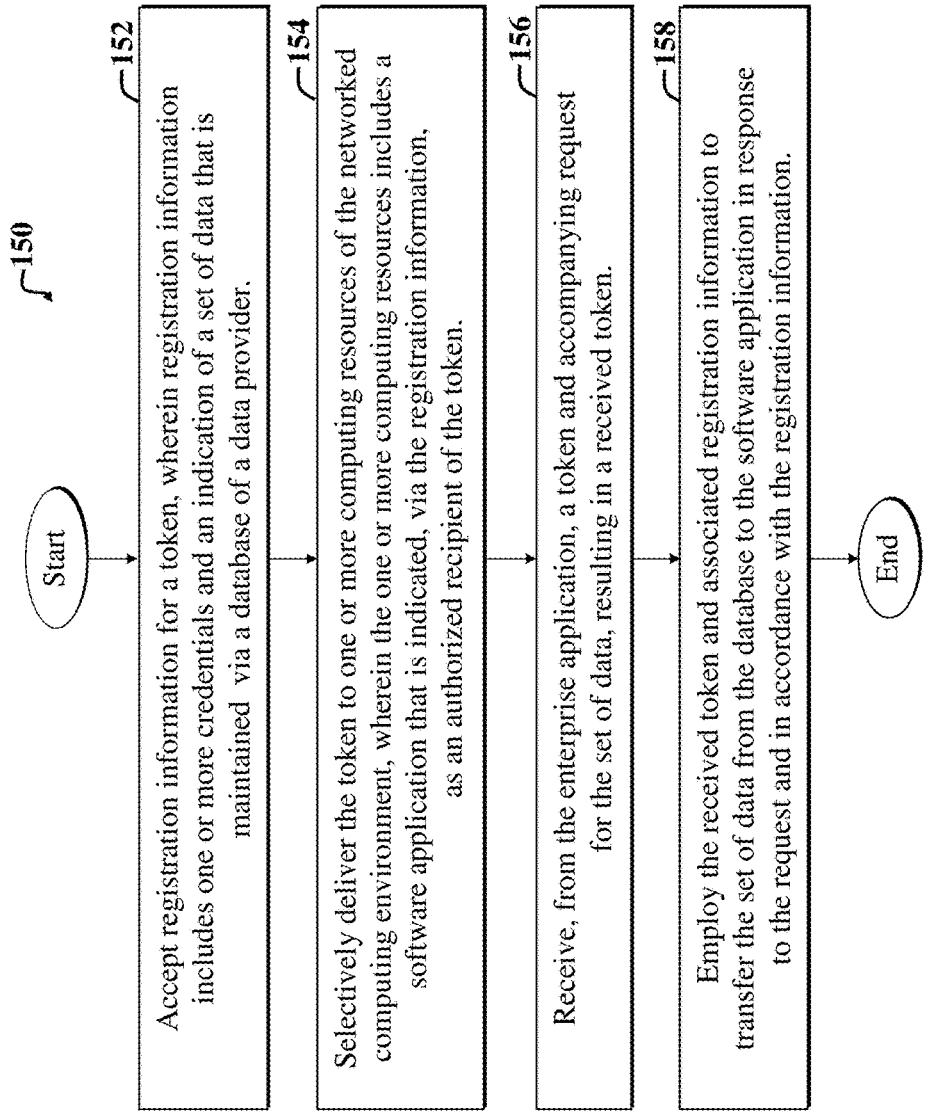
FIG. 6 is a flow diagram of a fourth example method implementable via the embodiments of FIGS. 1-2.

FIG. 6 is a flow diagram of a fourth example method 150 implementable via the embodiments of FIGS. 1-2. The fourth example method 150 facilitates transfer of secure data in a networked computing environment from the perspective of a secure connector.

A first step 152 includes accepting registration information for a token, wherein registration information includes one or more credentials and an indication of a set of data that is maintained via a database of a data provider.

A second step 154 includes selectively delivering the token to one or more computing resources of the networked computing environment. The one or more computing resources include a software application that is indicated, via the registration information, as a recipient of the token.

A third step 156 includes receiving, from the enterprise application, a token and accompanying request for the set of data, resulting in a received token.

A fourth step 158 includes employing the received token and associated registration information to transfer the set of data from the database to the software application in response to the request and in accordance with the registration information.

Note that the fourth example method 150 may be modified or augmented, without departing from the scope of the present teachings. For example, the method 150 may further specify that the token delivered to the software application includes a description of the set of data to be delivered based on the token.

The first step 152 may further specify that accepting registration information includes storing the registration information in a secure data store. The registration information may include a username and password for an account that includes or maintains the set of data.

The fourth step 158 may further specify using the token to retrieve the one or more credentials from the secure data store independently of the software application, whereby the token delivered to the software application does not include the one or more credentials. Furthermore the set of data to be retrieved from the database may represent a subset of information accessible to a client via a data provider when the client logs into a database of the data provider using the one or more credentials.

The first step 152 may further specify associating the token with a token policy. Information specifying the token policy may be included in the registration information. The token policy may further include or specify one or more settings specifying a particular data provider to have access to the set of data maintained for an account characterized by the credentials. The token policy may further include one or more settings specifying which of the one or more computing resources is to receive a copy of the token for use in selectively accessing data. The one or more computing resources may include one or more authenticated clients of the business application.

The fourth example method 150 may further specify that the steps 152-158 are implemented using, at least in part, a secure connector as a communications interface between the software application and a data provider that hosts the database. The fourth step 158 may further include performing token processing that further includes: performing a token look-up process to retrieve the registration information, the registration information including the one or more credentials and a token policy; implementing an application verification process that includes; accessing the registration information and information identifying the software application that has issued the request to verify that the software application is authorized to access the set of data indicated a specification of the token policy included among the registration information; and maintaining a usage log for the token, wherein the usage log maintains information about the number of uses of the token by one or more software applications, including the software application.

In an alternative implementation, the token policy is further associated with software functionality that is associated with the set of data. The software functionality may include, for example, computer code for generating a UI display screen and accompanying UI controls and functionality for facilitating user interaction with content that includes the set of data.

Figure 7:
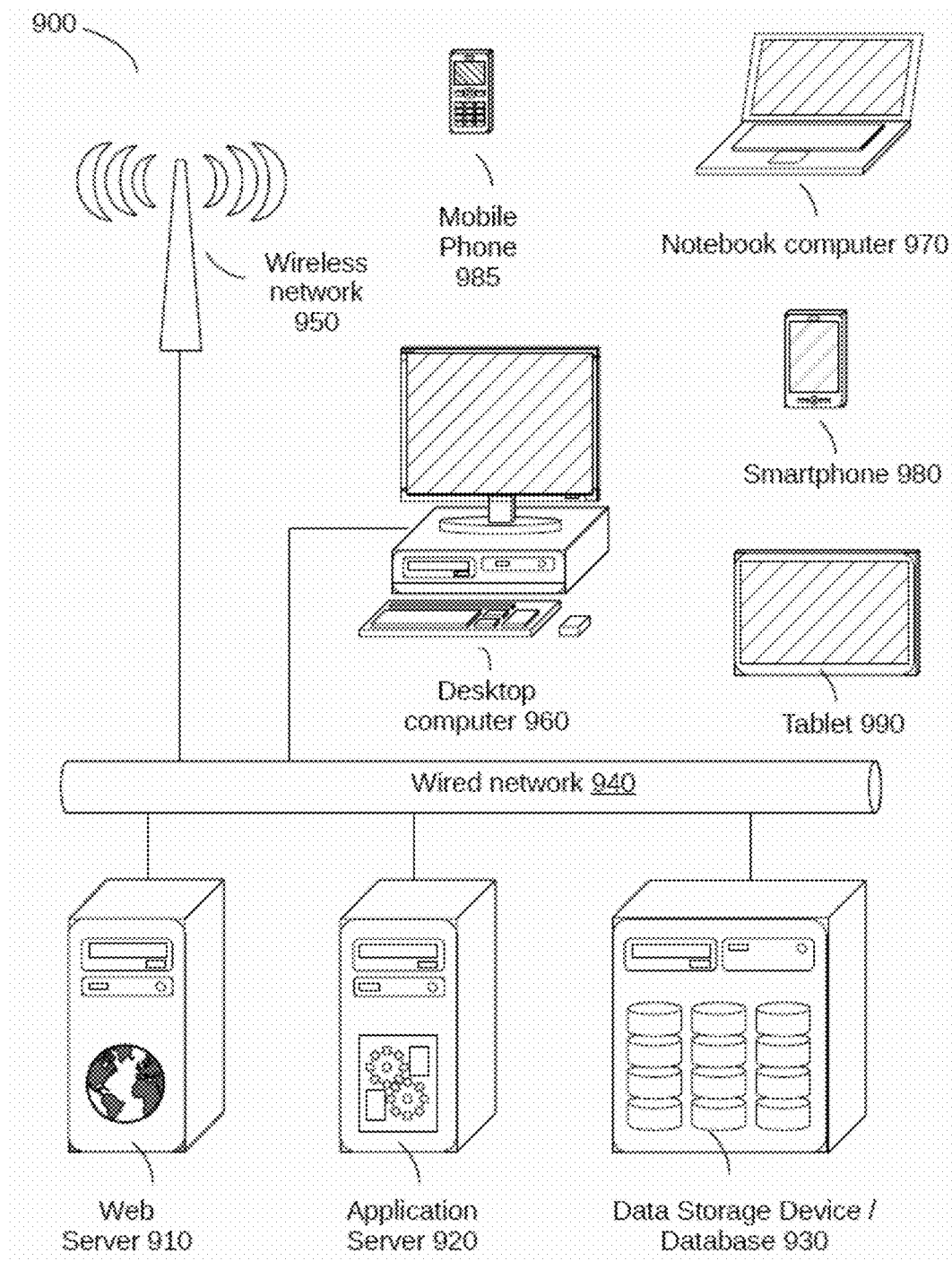
FIG. 7 is a general block diagram of a system and accompanying computing environment usable to implement the embodiments of FIGS. 1-6.

FIG. 7 is a general block diagram of a system 900 and accompanying computing environment usable to implement the embodiments of FIGS. 1-6. The example system 900 is capable of supporting or running various hardware and/or software modules and associated methods discussed with reference to FIGS. 1-6. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as Rich Site Summary (RSS) feeds of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computer.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 7, the client systems 12 of FIG. 1 may be implemented in whole or in part via one or more of the desktop computer 960, notebook computer 970, smartphone 980, mobile phone 985, tablet 990, of FIG. 7 and/or other computing devices. In a particular example embodiment, the computing devices 960-990 run browsers, e.g., the browsers 22-26 of FIG. 1, which may be used to display UIs for interacting with the business application(s) 28 and secure data store 32 of FIG. 1.

In a particular example embodiment, browsers 22-26 of the client systems 12 of FIG. 1 connect to the Internet, represented by the wired network 940 and/or wireless network 950 as shown in FIG. 7, to access one or more network-coupled servers, databases, and/or associated cloud-based functionality, as represented by the modules 28-44 of FIG. 1.

Note that one or more of the web server 910, application server 920, and data storage device or database 930 shown in FIG. 7 may be used to host software corresponding to the modules 28-44 of FIG. 1, as detailed more fully below.

In a particular example embodiment, the business application(s) 28 and accompanying token viewer 36; the secure connector 30 and accompanying token process 38; the secure data store 32 and accompanying token policy module 40 and accompanying tokens and credentials 42; the data provider(s) 34 and accompanying database(s) 44 of FIG. 1 run in a cloud computing environment that includes a collection of plural web servers 910, application servers 920, and data storage devices 930 shown in FIG. 7.

For example, in the particular example embodiment, the business application(s) 28 and accompanying token viewer 36 of FIG. 1 run on a process cloud that communicates with a document cloud via an integration mechanism, e.g., middleware, APIs, web services, etc.

The document cloud maintains data storage devices 930 of FIG. 7 to maintain data that is stored via the data provider(s) 34 and accompanying database(s) 44, and the secure data store 32 and accompanying database(s) 42 that maintain tokens and associated credentials 42 and token policy information 40 of FIG. 1. The process cloud in combination with the document cloud act as an overall cloud that supports development, deployment, adaptation, and use of software applications (e.g., the enterprise application(s) 28 of FIG. 1) and secure access thereto via a secure connector 30. The secure connector 30 may communicate with the secure data store 32 and database(s) 44 of the data provider(s) 34, which may in turn be maintained via software running on the application server 920 of FIG. 7 and in communication with the data storage device 930 of FIG. 1.

In general, software developers or other users of the example collaborative enterprise application(s) 28 of FIG. 1, developer systems 12 of FIG. 1, may subscribe to certain cloud services to facilitate development of and/or use of software applications and storage of associated files. A cloud service that is configured for software application or process flow development is called a Process Cloud Service (PCS) herein.

A process cloud service may employ a networked database, e.g., the data storage device 930 of FIG. 7, to store files and other objects used by a given software program being developed. Server-side development environments may be accessible to developers via browsers, e.g., the browsers 22-26 of FIG. 1. The development environments may be backed by the PCS, such that developed software application files are stored in the PCS database corresponding to the one or more of the data storage devices 930 of FIG. 7.

A document cloud may include document management functionality in communication with folder structures and documents and may incorporate functionality for adding rich metadata documents and folders. The document management functionality may include MetaData Services (MDS) for characterizing folders and documents and associated structures with various types of metadata. The document management functionality may further include software (which may include a combination of webpage code from a web server 910 of FIG. 7 and supporting application code of an application server 920 of FIG. 7, where the webpage code may call the application code using web services, APIs, etc.) for generating one or more customer UI display screens, e.g., UI display screens presented via browsers 22-26 of the client devices 12 of FIG. 1.

In the particular example embodiment, the UI display screens may be presented via the browsers 22-26 of FIG. 1 and may include accompanying UI controls and associated options. Example options include options to browse, create, delete, define, upload, download, etc., folders, structures, and documents, etc., as maintained via the folder structures and documents.

Note that in the particular example embodiment, browsers 22-26 used by the client systems 12 of FIG. 1, interface with web servers 910 shown in FIG. 7 to access websites and accompanying webpage code, which is backed by applications, e.g., the enterprise application(s) 28 and secure connector 30 of FIG. 1.

The webpage code of the web servers 910 of FIG. 7 uses web services, APIs, and/or other interfacing mechanisms to communicate with application software 28, 30 hosted on application servers 920 of FIG. 7 of the cloud, which includes a collection of web servers 910, application servers 920, and data storage devices 930 of FIG. 7.

Note that various embodiments discussed herein may provide substantial benefits in terms of enabling the sharing of secure data among different enterprise applications and/or user sessions thereof, that would not otherwise be possible without also sharing credentials or other authentication information that is required to access the secure data.

In particular, certain embodiments discussed herein leverage use of one or more tokens and a token map that associates the tokens with authentication information and one or more specified data providers to enable a secure connector to selectively use the token to retrieve credentials in response to a data request from an application. The secure connector facilitates fulfilling the data request by using the token to retrieve the authentication information, e.g., credentials needed to access and deliver the requested data from the secure data store to the requesting software application.

Accordingly, various embodiments provide new capabilities for efficient software adaptation, in part by uniquely leveraging specified associations between tokens and authentication information.

Figure 8:
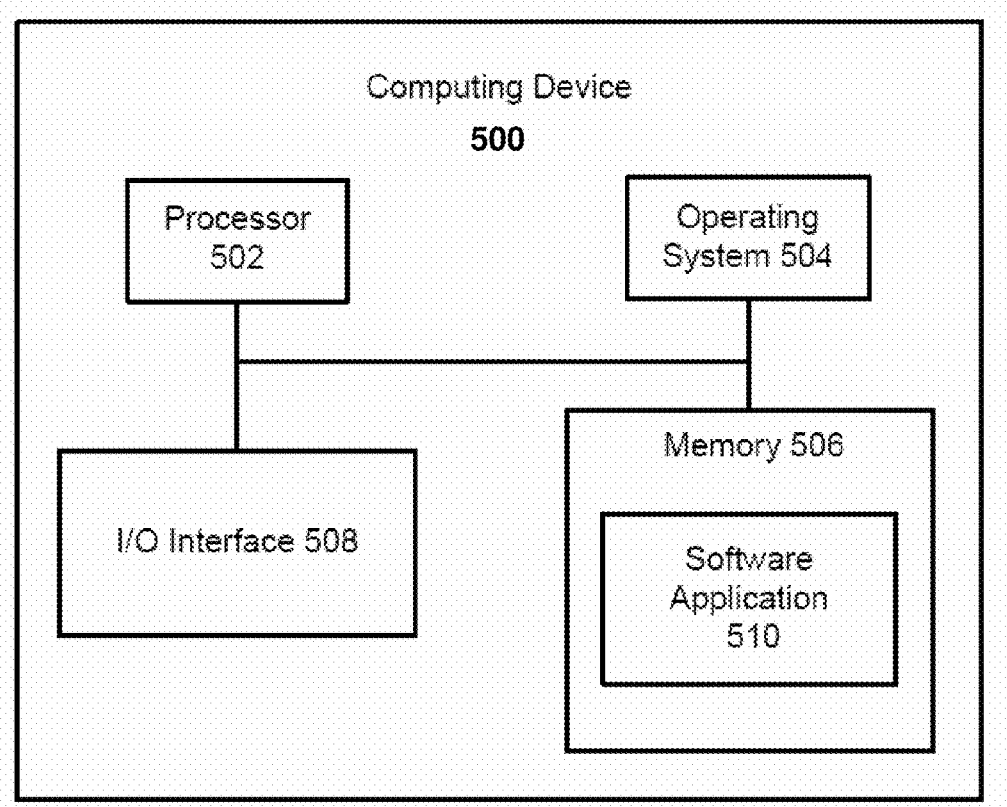
FIG. 8 is a general block diagram of a computing device usable to implement the embodiments of FIGS. 1-7.

FIG. 8 is a general block diagram of a computing device 500 usable to implement the embodiments described herein. While the computing device 500 of FIG. 8 may be described as performing one or more of the steps in the embodiments herein. In other embodiments, any suitable component or combination of components of the computing device 500 or any suitable processor or processors associated with system 500 may facilitate performing the steps.

FIG. 8 illustrates a block diagram of an example computing system 500, which may be used for implementations described herein. For example, computing system 500 may be used to implement server devices 910, 920 of FIG. 7 as well as to perform the method implementations described herein.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 8 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address use of tokens to facilitate data access by a software application, embodiments are not limited to mere data access. For example, embodiments may employ use of tokens as discussed herein to facilitate writing data to a data store and/or accessing software functionality provided by the data store and/or provided by another software application that is configured to enable access to data and/or functionality in response to the supplying of credentials.

Note that embodiments for enabling access to functionality may readily be adapted and used with embodiments discussed therein that leverage an intermediate secure connector to selectively retrieve authentication information, e.g., account credentials, from a secure data store, in response to a supplied (by a software application) token or token name, to thereby enable access to the data and/or functionality by another software application, without departing from the scope of the present teachings.

Furthermore, while various embodiments are discussed herein within the context of cloud-based enterprise applications and third party web applications, embodiments are not limited thereto. Other types of applications and associated sessions may employ methods discussed herein to facilitate confidential data and/or functionality sharing, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating sharing secure access to data and/or functionality while keeping specific credentials used for the secure access secret, the method comprising:

determining a token, the token having been preassociated with one or more account credentials and an identification of a data provider for which the account credentials apply;

sending a token name to the software application;

receiving the token name at a secure connector from the software application to facilitate accessing data of the data provider by the secure connector;

receiving, at the secure connector, a request from the software application to access the data of the data provider;

employing the secure connector to use the token name to obtain the account credentials and identification of the data provider in response to receipt of the token name and the request by the secure connector; and providing the account credentials from the secure connector to the data provider so as to fulfill the request by the software application;

wherein employing the secure connector further includes: using the token name to retrieve the account credentials and identification of the data provider from a secure data store, wherein employing the secure connector further includes: implementing a token process that includes: using the token name to access the secure data store to retrieve the one or more account credentials and the identification of the data provider associated with the token name;

verifying that the data provider pertaining to the request to access data of the data provider matches the data provider indicated by the token name, wherein the token name is received by the secure connector from the software application in association with the request to access data of the data provider, wherein the token process further includes: logging each use of the token.

2. The method of claim 1, wherein determining a token further includes: receiving token information specified by an account holder of an account to which the token information applies, wherein the token information includes the account credentials and the indication of the data provider that maintains the account.

3. The method of claim 2, wherein determining a token further includes: sending, to the software application, a listing of one or more tokens from the secure data store, the listing of one or more tokens having been setup by one or more users of the secure data store or by another software application or component in communication with the secure data store.

4. The method of claim 3, wherein sending further includes: employing a token viewer to enable the software application to access a listing of one or more tokens, the listing of one or more tokens including a listing of one or more token names and one or more token descriptions characterizing or associated with the one or more token names.

5. The method of claim 1, wherein the token process further includes: monitoring use of the token for any unauthorized use of the token.

6. The method of claim 1, wherein the token process further includes: ensuring that the software application issuing the request to access the data of the data provider is authorized to access the secure connector.

7. The method of claim 1, wherein the token process further includes: ensuring that the software application issuing the request to access the data of the data provider is authorized to use the token name to access the data of the data provider using the token, as specified via a predetermined token policy.

8. A non-transitory processor-readable storage device including instructions executable by one or more processors for:
   determining a token, the token having been preassociated with one or more account credentials and an identification of a data provider for which the account credentials apply;
   sending a token name to the software application; receiving the token name at a secure connector from the software application to facilitate accessing data of the data provider by the secure connector;
   receiving, at the secure connector, a request from the software application to access the data of the data provider;
   employing the secure connector to use the token name to obtain the account credentials and identification of the data provider in response to receipt of the token name and the request by the secure connector; and providing the account credentials and identification of the data provider from the secure connector to the data provider so as to fulfill the request by the software application,
   wherein employing the secure connector further includes: using the token name to retrieve the account credentials and identification of the data provider from a secure data store,
   wherein employing the secure connector further includes: implementing a token process that includes: using the token name to access the secure data store to retrieve the one or more account credentials and the identification of the data provider associated with the token name;
   verifying that the data provider pertaining to the request to access data of the data provider matches the data provider indicated by the token name, wherein the token name is received by the secure connector from the software application in association with the request to access data of the data provider,
   wherein the token process further includes: logging each use of the token.

9. The non-transitory processor-readable storage device of claim 8, wherein employing the secure connector further includes: using the token name to retrieve the account credentials and identification of the data provider from a secure data store.

10. The non-transitory processor-readable storage device of claim 9, wherein determining a token further includes: receiving token information specified by an account holder of an account to which the token information applies, wherein the token information includes the account credentials and the indication of the data provider that maintains the account.

11. The non-transitory processor-readable storage device of claim 10, wherein determining a token further includes: sending, to the software application, a listing of one or more tokens from the secure data store, the listing of one or more tokens having been setup by one or more users of the secure data store or by another software application or component in communication with the secure data store.

12. The non-transitory processor-readable storage device of claim 11, wherein sending further includes: employing a token viewer to enable the software application to access a listing of one or more tokens, the listing of one or more tokens including a listing of one or more token names and one or more token descriptions characterizing or associated with the one or more token names.

13. The non-transitory processor-readable storage device of claim 9, wherein employing the secure connector further includes: implementing a token process that includes: using the token name to access the secure data store to retrieve the one or more account credentials and the identification of the data provider associated with the token name; verifying that the data provider pertaining to the request to access data of the data provider matches the data provider indicated by the token name, wherein the token name is received by the secure connector from the software application in association with the request to access data of the data provider.

14. The non-transitory processor-readable storage device of claim 13, wherein the token process further includes: logging each use of the token.

15. The non-transitory processor-readable storage device of claim 13, wherein the token process further includes: monitoring use of the token for any unauthorized use of the token.

16. The non-transitory processor-readable storage device of claim 13, wherein the token process further includes: ensuring that the software application issuing the request to access the data of the data provider is authorized to access the secure connector.

17. An apparatus for facilitating sharing secure access to data and/or functionality while keeping specific credentials used for the secure access secret, the apparatus comprising:
   one or more processors;
   a tangible processor-readable storage device including instructions for:
      determining a token, the token having been preassociated with one or more account credentials and an identification of a data provider for which the account credentials apply;
      sending a token name to the software application;
      receiving the token name at a secure connector from the software application to facilitate accessing data of the data provider by the secure connector;
      receiving, at the secure connector, a request from the software application to access the data of the data provider;
      employing the secure connector to use the token name to obtain the account credentials and identification of the data provider in response to receipt of the token name and the request by the secure connector; and
      providing the account credentials and identification of the data provider from the secure connector to the data provider so as to fulfill the request by the software application;
   wherein employing the secure connector further includes: using the token name to retrieve the account credentials and identification of the data provider from a secure data store,
   wherein employing the secure connector further includes: implementing a token process that includes: using the token name to access the secure data store to retrieve the one or more account credentials and the identification of the data provider associated with the token name;
   verifying that the data provider pertaining to the request to access data of the data provider matches the data provider indicated by the token name, wherein the token name is received by the secure connector from the software application in association with the request to access data of the data provider,
   wherein the token process further includes: logging each use of the token.

* * * * *

UNITED STATES PATENT AND TRADEMARK OFFICE
CERTIFICATE OF CORRECTION

PATENT NO. : 10,348,718 B2
APPLICATION NO. : 15/473498
DATED : July 9, 2019
INVENTOR(S) : Thakkar Page 1 of 1

It is certified that error appears in the above-identified patent and that said Letters Patent is hereby corrected as shown below:

In the Specification

Column 5, Line 14, delete "crypotgraphical" and insert -- cryptographical --, therefor.

Column 14, Line 48, delete "for for" and insert -- for --, therefor.

Signed and Sealed this
Twenty-eighth Day of July, 2020

Andrei Iancu
*Director of the United States Patent and Trademark Office*